June 26, 1962  J. A. NEWTON  3,040,417
METHOD OF MAKING A COMPOSITE VALVE
Filed March 7, 1957  2 Sheets-Sheet 1
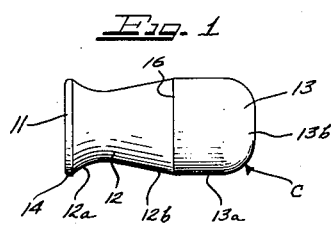
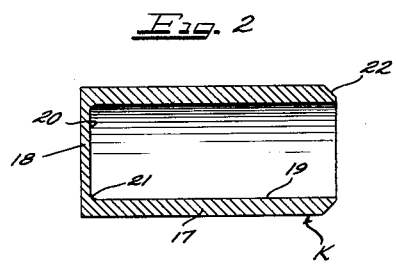
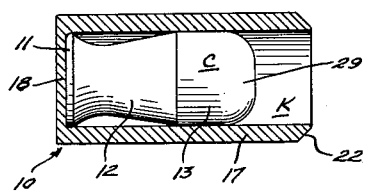
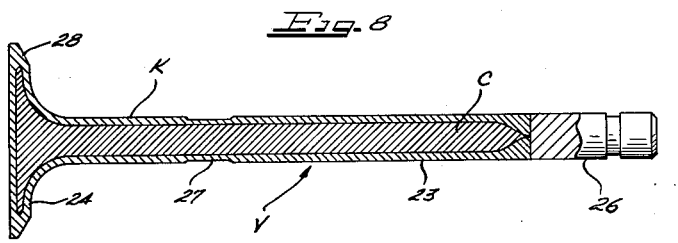
Inventor
JOHN A. NEWTON
by Hill, Sherman, Meroni, Gross & Simpson Attys.

June 26, 1962 — J. A. NEWTON — 3,040,417

METHOD OF MAKING A COMPOSITE VALVE

Filed March 7, 1957 — 2 Sheets-Sheet 2

Inventor
JOHN A. NEWTON

United States Patent Office 3,040,417
Patented June 26, 1962

3,040,417
METHOD OF MAKING A COMPOSITE VALVE
John A. Newton, Eastlake, Ohio, assignor to Thompson Ramo Wooldridge Inc., a corporation of Ohio
Filed Mar. 7, 1957, Ser. No. 644,651
6 Claims. (Cl. 29—156.7)

This invention relates to a composite valve slug construction and a method of making a composite valve that is particularly adapted to be formed into a poppet type valve for use in internal combustion engines, and more specifically relates to a composite valve slug and method of making a composite valve having an integral high-strength inner core and a corrosion resistant outer case.

The higher speeds and power output requirements demanded from modern internal combustion engines has imposed increasingly more severe operating conditions on the valves of such engines, particularly the poppet type exhaust valve, such that a single valve material cannot be expected to adequately withstand the extreme operating temperatures, valve actuating stresses and corrosive forces acting on the valve for any extended period of operation.

One solution to this problem has taken the form of composite valve construction which utilizes a relatively high-strength inner core and a soft corrosion resistant outer ductile case, together with a separately formed hardened stem tip, the individual properties of each of the materials used in the composite valve mutually contributing to provide a resultant valve capable of withstanding higher operating temperatures and stresses for a considerably longer period of time than is possible with a conventionally constructed valve utilizing a single material throughout.

Admitting the superiority of the composite material construction type poppet valve, an additional problem arose in the construction of this type of valve, particularly where a high-strength inner core material and a soft ductile outer case material are combined in the head and stem portions of the valve, in that during the forming operations, the relatively soft outer case material was subject to rupturing and stress concentrations due to the general refractory nature of the inner core material and often times an imperfect bond would develop between the inner core and outer case, particularly in the area of the junction between the head and stem.

The present invention offers one solution to several of the problems being encountered in the formation of a composite valve structure in the form of a novel composite slug construction that utilizes a novelly shaped core and outer case element, each of which is preformed to a predetermined shape that will provide a uniform flow of the core and case materials during the forming operation, and will insure a complete bonding between these elements in the finished valve, while at the same time minimizing the danger of stress concentrations and rupturing of the relatively soft outer case material.

It is an object then of the present invention to provide an improved composite valve slug construction and method of making a composite valve.

Another object of the present invention is to provide an improved composite valve slug construction for use in the formation of a composite valve that will reduce the danger of stress concentrations or rupturing of the soft outer case material during the forming operation and that will also insure a complete bond between the core and case material in the finished valve.

Still another object of the present invention, is to provide a composite valve slug construction having a novelly shaped inner core and outer case element that will facilitate the formation of the composite slug into a completed valve, which shape will also minimize the danger of rupturing or nonuniform inner core and outer case material distribution during the forming operation, as well as to reduce stress concentrations in the completed valve.

A further object of the present invention is to provide an improved method of making a composite valve from a composite valve slug construction having a hard inner core and a soft corrosion resistant outer case wherein the relatively hard inner core acts as a forming die to facilitate the formation and closing of the outer case material about the inner core.

Still another object of the present invention is to provide an improved method of making a composite valve from a composite valve slug construction having a strong inner core and a soft corrosion resistant outer case wherein a uniform distribution of the outer case and inner core slug materials will be obtained in the head and stem portions of the valve at the completion of the forming operation.

Many other objects and advantages of the present invention will become manifest to those versed in the art upon making reference to the accompanying drawing and detailed description which follows, that form a part of this specification.

In the drawings:

FIGURE 1 is an elevational view of the high-strength inner core slug that is formed with a shape in accordance with the principles of the present invention;

FIGURE 2 is a cross-sectional view of the soft corrosion resistant outer case slug that is also formed with a shape in accordance with the principles of the present invention;

FIGURE 3 is an assembly view of the composite valve slug of the present invention, partly in section and partly in elevation, showing the relative position of the inner core slug and outer case slug before the forming operation is initiated;

Figure 7:
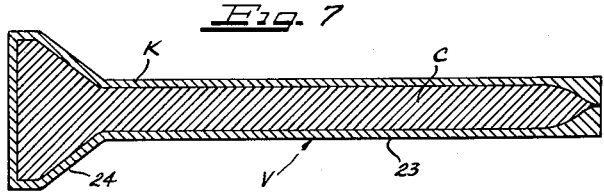

FIGURE 7 is a longitudinal cross-sectional view of the composite valve that has been formed according to the principles of the present invention, showing the general distribution of the outer case and inner core materials in the valve, prior to the final forming operations; and FIGURE 8 is a longitudinal cross-sectional view of a finished composite valve that has been formed from the rough formed valve illustrated in FIGURE 7, and showing the final distribution and shape of the hardened inner core material and soft outer case material in the finished valve.

As shown on the drawings:

In FIGURE 3, the composite valve slug assembly 10 of the present invention includes a relatively hard high-strength inner core slug C (FIGURE 1) and a relatively soft outer case slug K (FIGURE 2).

As best shown in FIGURE 1, the inner core slug C is formed with a head portion 11, a reduced diameter neck portion 12 and a body portion 13. The head portion 11 and body portion 13, have substantially the same diameter, but the head portion 11 is formed with a relatively short axial length as compared to the body portion 13. The head portion 11 also has its side and end face portions rounded, as at 14, to facilitate the flow of the outer case slug material around the inner core slug C during the forming operation, as will be explained in more detail as the description proceeds.

The neck portion 12 of the inner core slug C, comprises about one half the total axial length of the inner core slug C, and includes a radius portion 12a, adjacent the head portion 11, which flares into a radially outwardly tapering portion 12b adjacent the body portion 13, the tapering portion 12b ending abruptly along an annular line of intersection 16 between the neck portion 12 and the full diameter body portion 13.

The body portion 13 includes a generally cylindrical portion 13a that is rounded at the end to form a domed end 13b, having a radius of curvature approximating the radius of the cylindrical body portion 13a.

The inner core slug C may be formed of any suitable material having high-strength characteristics, as for example molybdenum, but it should be understood that any other suitable high-strength material could be used as well.

Referring now to FIGURE 2, the outer case slug K is formed with a general cup-shaped configuration, having a tubular side wall portion 17 and a generally flat end wall 18. The tubular side wall 17 and end wall 18 thus define an inner cylindrical side wall surface 19 and an inner end wall surface 20 having an annular juncture point that is formed with a radius or fillet 21 substantially equal in curvature to the rounded edge 14 of the inner core slug C. The tubular side wall 17 of the outer case slug K is annularly chamfered as at 22, around its mouth portion, to facilitate the flow of the outer case slug material into the stem of the completed valve at the initiation of the valve forming operations.

The outer case slug K may be constructed of any soft ductile material having good corrosion resistant properties, as for example Nichrome, but it should be understood that any other suitable material might be used instead.

As best shown in FIGURE 3, the composite valve slug assembly 10 is assembled so that the inner core slug C has its head portion 11 in abutting engagement with the inner end wall surface 20 of the cup-shaped outer core slug K. The annular rounded edge portion 14 of the inner core slug C, will thus be retained in nested engagement with the annular internal radius 21 at the intersection of the inner cylindrical side wall surface 19 and end wall surface 20. The internal diameter of the tubular side wall 17 approximately equals that of the external diameters of the head and body portions 11 and 13 of the inner core slug C, such that when the inner core slug C has been inserted head first into the outer case slug K, as indicated in FIGURE 3, the cylindrical portions of the head 11 and body 13 of the inner core slug C will be in snug fitting engagement. When the respective inner core slug C and outer case slug K have been assembled as illustrated in FIGURE 3, the composite valve slug assembly 10 is ready to be formed into a finished composite valve, such as is illustrated in FIGURE 8 and designated by the reference letter V.

The finished composite valve V of FIGURE 8 includes a stem portion 23, a head portion 24 and a hardened tip portion 26. The stem portion 23 may be grooved as at 27 to form a locking shoulder for a valve guide (not shown). The head 24 is also faced off as at 28 to provide an annular chamfered surface that will engage a correspondingly tapered valve seat surface in the engine, according to well known techniques.

The advantages of the novelly shaped inner core slug C and outer case slug K of the composite valve slug assembly 10 during the subsequent forming operations will now be explained.

Before the actual forming operation is initiated, it may be desirable to coat the external surfaces of the inner core slug C with glass, as at 29, or some other suitable plating material, to reduce any generated frictional stresses that may develop as a result of the relative movement and flow of the inner core and outer case materials during the extrusion operation and to prevent excessive oxidation of the molybdenum core slug C, it being desirable to preheat the inner core slug C to a temperature approximating 2050° F., to facilitate the forming operation due to the refractory nature of the inner core slug C.

Figure 4:
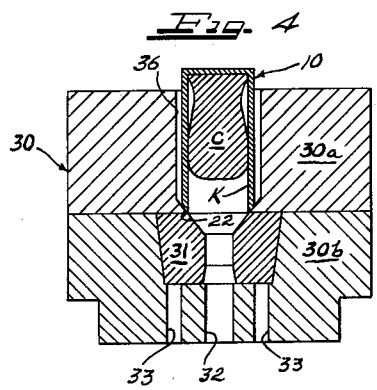
FIGURE 4 is a reduced cross-sectional view, showing the general position and relationship of the composite valve slug of the invention when properly positioned in a valve forming die prior to the valve forming operation.
Figure 5:
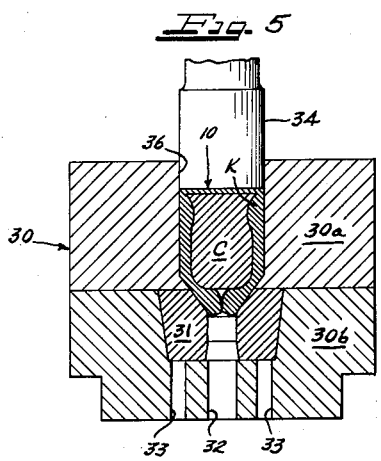
FIGURE 5 is a view similar to FIGURE 4, showing the general deformed shape of the valve slug prior to the valve stem forming operation.
Figure 6:
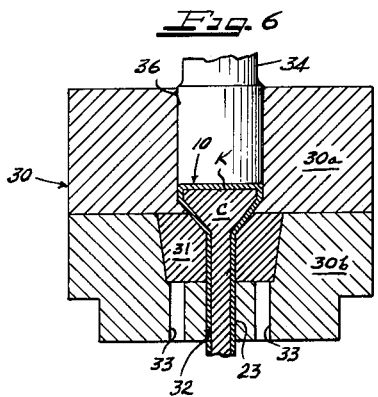
FIGURE 6, is another view similar to FIGURE 4, but showing the general shape and distribution of the outer case and inner core slug material at the completion of the head and stem forming operation.

As best shown in FIGURES 4-6, the method of forming the composite valve slug 10 into the finished valve V of FIGURE 8 is preferably accomplished by a single die forming operation, through a multiple die forming operation, or any other conventional forming techniques could be employed instead.

The forming die 30 illustrated in FIGURES 4-6 generally includes an upper valve head forming portion 30a and a lower valve stem forming portion 30b, that includes a hardened valve stem extrusion orifice insert 31, having a central valve stem die bore 32, and a plurality of ejection bores 33 that register with the hardened valve stem extrusion orifice insert 31 to permit ejection and the substitution of inserts having various sized extrusion orifices, or replacement of the insert after the die has become worn.

The piston or ram 34 (FIGURES 5 and 6) is formed with a diameter such as to permit a close sliding tolerance in a valve head forming bore 36 in the upper valve head forming die 38, to thus confine the composite valve slug 10 in the forming die 30.

When the composite valve slug 10 has been properly positioned and aligned in the forming die 30, prior to the actual forming operation, the composite valve slug 10 will assume the general position illustrated in FIGURE 4.

It should be noted that before the composite valve slug 10 is subjected to forming pressure from the ram 34, the inner core slug C is preferably heated to a temperature of approximately 2050° F., and coated with glass both to prevent oxidation of the slug and to facilitate the flow of the inner core slug material into the valve stem portion 23 (FIGURES 6, 7 and 8) of the completed valve, as previously mentioned.

After the ram 34 has been brought into abutting engagement with the top portion of the composite valve slug 10, and has moved downwardly in the upper valve head forming portion 30a of the die 30, the chamfered end portion 22 of the outer case slug K (FIGURES 2, 3 and 4), will cause a necking down of the outer case slug K around the body portion 13 (FIGURE 3) of the inner core slug C such that the composite slug 10 will assume the general position and shape illustrated in FIGURE 5.

It should be noted that the outer case slug material K will thus have flowed into the reduced neck portion 12 of the inner core slug C (FIGURES 1 and 3), and will have generally built up around the body portion 13 of the inner core slug C, prior to the extrusion of the valve stem portion 23.

Continued downward movement of the ram 34 in the die 30 will cause the body portion 13 and adjacent outer case slug material K of composite valve slug 10 to be extruded through the hardened extrusion orifice insert 31 in the lower valve stem forming portion 30b to thus form the stem portion 23 of the finished valve, such that the composite valve slug 10 will be formed into the general valve shape shown in FIGURES 6 and 7. When the ram 34 has reached the lower limit position illustrated in FIGURE 6, the composite valve blank V will thereafter be removed from the die 30 for the final forming operation into the finished composite valve V, illustrated in FIGURE 8. The valve blank V illustrated in FIGURE 7 may be formed into the finished valve V of FIGURE 8 by forging or any other conventional forming techniques.

As shown in FIGURES 7 and 8, the hardened inner core slug material C will generally occupy the central portion of the stem 23 and will flare radially outwardly into the head portion 24, such that not only will the stem portion 23 have the high strength characteristics provided by the hard inner core material, but also the head portion 24 will similarly be strengthened in the area of contact of the head portion 24 with the hardened seat in the engine (not shown).

As previously mentioned, the hardened stem 26 may be connected to the composite valve stem 23 after the completion of the forming operation of the stem portion 23, or on the completion of both the stem and head portions 23 and 24, respectively.

Thus it will be appreciated that the composite valve slug assembly 10 presents a novel composite valve slug construction that facilitates its formation into a composite valve structure according to the principles of the composite valve forming method herein described, as a result of the novel shape of the inner core slug and outer case slug materials, which shape also provides a smoother flow of the soft outer case slug material around the hardened inner core slug material as well as minimizing the danger of rupturing of the soft outer case material during the forming operation, and also insures a more complete and uniform bond between the inner and outer slug materials.

While only one specific embodiment of the composite valve slug assembly has been herein described, it should be understood that variations and modifications may be effected without departing from the scope of the novel concepts herein disclosed.

I claim as my invention:

1. A method of making a composite valve from a composite valve slug having a generally cylindrical cup-shaped outer case slug part and an inner core slug part formed with a head portion, a central necked-down portion and a body portion, the diameters of the body and head portions being generally the same and corresponding closely with the inner diameter of the case and the diameter of the necked-down portion being markedly less than the case inner diameter to be spaced therefrom when the core is entirely contained in the case and extruded essentially simultaneously therewith, coating the inner core slug part with an oxidation preventing material, heating the inner core slug part to a forming temperature, inserting the heated inner core slug part head first into the outer case slug part so that the head portion of the inner core slug part abuts the inner end wall of the outer case slug part, placing the composite slug in a die having an extrusion orifice, applying pressure to the slug to flow the outer case slug part around the inner core slug part, extruding a portion of the composite slug through the extrusion orifice in the die to form the valve stem of the composite valve, forming the valve head portion of the blank into a completed valve head, forming the valve stem portion of the blank into a completed valve stem, and finish forming the composite valve blank into a composite valve.

2. A method of making a composite valve from a composite valve slug having a generally cylindrical cup-shaped outer case slug part and an inner core slug part formed with a head portion, a central necked-down portion and a body portion, the diameters of the body and head portions being generally the same and corresponding closely with the inner diameter of the case and the diameter of the necked-down portion being markedly less than the case inner diameter to be spaced therefrom when the core is entirely contained in the case and extruded essentially simultaneously therewith, which comprises the steps of inserting the inner core slug part head first into the outer case slug part so that the head portion of the inner core slug part abuts the inner end wall of the outer case slug part, placing the composite slug in a die, having an extrusion orifice, applying pressure to the slug to flow the outer case slug part around the inner core slug part, extruding a portion of the composite slug through the extrusion orifice in the die to form the valve stem of the composite valve, removing the partially formed valve blank from the die, fastening a hardened valve stem tip to the valve stem tip portion of the extruded valve stem blank, forming the valve head portion of the blank into a completed valve head, and finish forming the composite valve blank into a composite valve.

3. A method of making a composite valve from a composite valve slug having a generally cylindrical cup-shaped outer case slug part and an inner core slug part formed with a head portion, a central necked-down portion and a body portion, the diameters of the body and head portions being generally the same and corresponding closely with the inner diameter of the case and the diameter of the necked-down portion being markedly less than the case inner diameter to be spaced therefrom when the core is entirely contained in the case and extruded essentially simultaneously therewith, which comprises the steps of coating the inner core slug part with an oxidation preventing material, heating the inner core slug part to a forming temperature, inserting the heated inner core slug part head first into the outer case slug parts so that the head portion of the inner core slug part abuts the inner end wall of the outer case slug part, placing the composite slug in a die having an extrusion orifice, applying pressure to the slug to flow the outer case slug part around the inner core slug part, extruding a portion of the composite slug through the extrusion orifice in the die to form the valve stem of the composite valve, fastening a hardened valve stem tip to the valve stem tip portion of the extruded valve stem blank, and finish forming the composite valve blank and hardened tip into a composite valve.

4. A slug assembly for extrusion into a composite cored poppet valve, comprising a generally cylindrical outer casing of cup-shaped configuration having concentric inner and outer diameters and a substantially flat inner end wall, and a pre-formed substantially cylindrical inner core entirely contained in said casing and extrudable therewith to form the composite valve, the core having a body portion and head portion the diameters of which closely correspond with the inner diameter of the casing to provide a tight fit therewith and a reduced diameter neck portion intermediate the body and head portions and spaced inwardly from the casing inner diameter, the head portion having a flat end surface bearing against the flat inner end wall of the casing, the neck portion being of general hourglass configuration having connecting substantially conical sections the altitudes of which are of different lengths, said neck portion providing a sink for metal of the casing during essentially simultaneous extrusion of the core and casing to prevent rupture of the casing.

5. A slug assembly for extrusion into a composite core poppet valve, comprising a generally cylindrical outer casing of cup-shaped configuration having concentric inner and outer diameters and a substantially flat inner end wall, and a pre-formed substantially cylindrical inner core entirely contained in said casing and extrudable therewith to form the composite valve, the core having a body portion and head portion the diameters of which closely correspond with the inner diameter of the casing to provide a tight fit therewith and a reduced diameter neck portion intermediate the body and head portions and spaced inwardly from the casing inner diameter, the head portion having a flat end surface bearing against the flat inner end wall of the casing, the relative axial lengths of the body and neck portions being generally the same and being substantially greater than the axial length of the head portion, the neck portion extending for approximately one-half of the total axial length of the core and having a first radially outwardly tapering section adjacent the head portion and a connecting second radially outwardly tapering section adjacent the body portion, said first and second sections providing a sink for metal of the casing during essentially simultaneous extrusion of the core and casing to prevent rupture of the casing.

6. A method of making a composite cored poppet valve, which comprises forming a generally cylindrical outer casing of cup-shaped configuration, forming a generally cylindrical inner core with body and head portions thereon having diameters closely corresponding with the inner diameters of the casing and with an intermediate neck portion having a diameter substantially less than the casing inner diameter to be spaced therefrom when the core is entirely contained in the casing, inserting the core in the casing with the head portion of the core abutting flushly against the closed end of the casing and the head and body portions in close fitting contact with the casing inner diameter, and essentially simultaneously extruding the casing and the core to sequentially flow the casing about the core, initially forming the valve stem and head portions and then finish forming said portions into a composite cored poppet valve.

References Cited in the file of this patent

UNITED STATES PATENTS

| | | |
|---|---|---|
| 1,892,569 | Gathmann | Dec. 27, 1932 |
| 2,093,776 | Colwell | Sept. 21, 1937 |
| 2,131,953 | Jardine | Oct. 4, 1938 |
| 2,282,462 | Dornin | May 12, 1942 |
| 2,609,576 | Roush | Sept. 9, 1952 |
| 2,706,850 | Sejournet | Apr. 26, 1955 |
| 2,713,859 | Bradfield | July 26, 1955 |

FOREIGN PATENTS

| | | |
|---|---|---|
| 782,670 | France | June 8, 1935 |